UNITED STATES PATENT OFFICE.

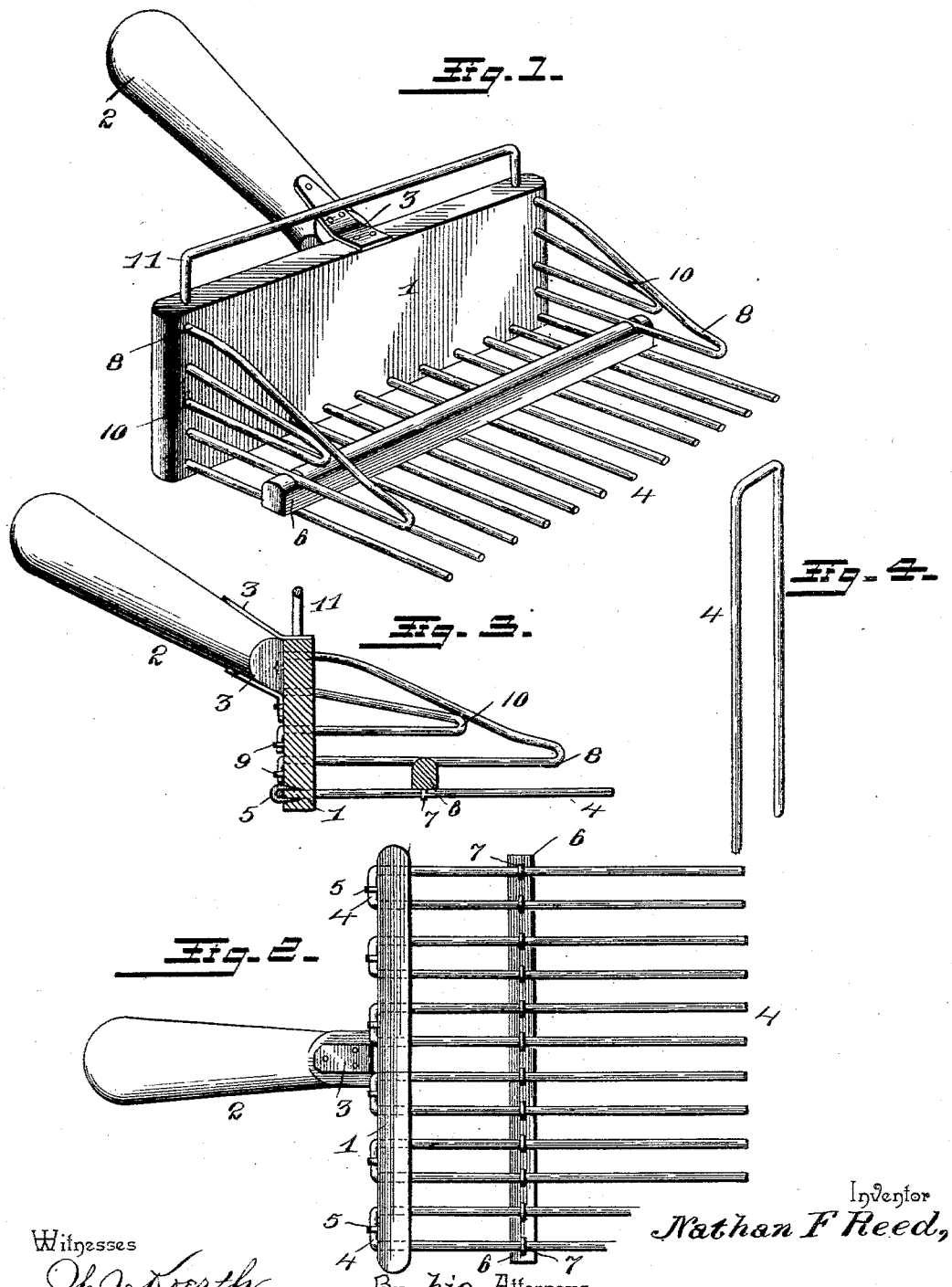

NATHAN F. REED, OF JOHNSON, VERMONT.

POTATO FORK OR SCOOP.

SPECIFICATION forming part of Letters Patent No. 566,868, dated September 1, 1896.

Application filed September 28, 1895. Serial No. 564,041. (No model.)

*To all whom it may concern:*

Be it known that I, NATHAN F. REED, a citizen of the United States, residing at Johnson, in the county of Lamoille and State of Vermont, have invented a new and useful Potato Fork or Scoop, of which the following is a specification.

This invention relates to an improvement in potato forks or scoops, and has for its object to simplify and improve the construction of articles of this nature, with a view to rendering the same more durable and efficient in practice and convenient in use.

The invention consists in certain novel features and details of construction and arrangement of parts, as hereinafter fully described, illustrated in the drawings, and finally embodied in the claims hereto appended.

In the accompanying drawings, Figure 1 is a perspective view of the improved potato-fork constructed after the manner of this invention. Fig. 2 is a bottom plan view of the same. Fig. 3 is a vertical longitudinal section through the fork. Fig. 4 is a detail perspective view of a double tine.

Similar numerals of reference designate corresponding parts in the several figures of the drawings.

Referring to the accompanying drawings, 1 designates the fork-head, which, for the purpose of carrying out the present invention, is preferably made of wood and in substantially rectangular form. The fork-head has rigidly attached thereto a handle 2, of any desired length, preferably of sufficient length to enable a person while standing to manipulate the fork for the purpose of lifting the potatoes from the soil. In order to strengthen the attachment of the handle to the fork-head, suitable straps or plates 3 of metal are secured to the upper and lower sides of said handle, and also to the upper edge of the fork-head, and to the rear face of said head, as shown.

4 designates a series of tines, which are made double, as shown in Fig. 4, each comprising two parallel arms or single tines, which are connected at their rear ends by an integral cross-bar. These tines are preferably made from stout steel wire and are driven through the fork-head from the rear side until the connecting portion abuts against the rear face of the fork-head, whereupon a series of staples 5, one for each double tine, are driven into the rear face of the fork-head, so as to stride the connecting portions of the double tines, and thus prevent the possibility of the tines pushing backward through the fork-head. This construction affords a very simple, inexpensive, and yet thoroughly effective means for securing the tines.

6 designates a cross-bar or transverse guard, which is preferably made of wood and arranged above and having its upper edge projected any desired distance above the plane of the tines 4. Staples 7 are driven into the bottom edge of said cross-bar, so as to embrace and hold the tines thereto and at the desired space apart, as shown in the bottom plan view. The cross-bar 6 extends over and above all the tines and is provided at its opposite ends and in its upper edge with notches, into which fit the lower arms or portions of a pair of end guards 8. These end guards are also preferably made of wire of a gage corresponding approximately to the tines, and are substantially V-shaped, or made tapering or converging to a point at their advance ends, the rear ends or terminals thereof being passed through the fork-head and deflected against the rear face thereof and secured by staples 9 in a manner similar to the way in which the tines are secured. Each of said end guards also comprises a smaller and interiorly-arranged V-shaped guard 10, whereby the space between the arms of the guards 8 is reduced and obstructed, so as to prevent the potatoes from rolling endwise from off the fork.

By means of the construction above described a very simple, durable, and efficient potato fork or scoop is provided, in which provision is made for retaining potatoes in the scoop while in the act of picking up additional potatoes, this being accomplished with the aid of the cross-bar or guard extending above and transversely of the tines. The potatoes as they are picked up by the fork are caused by a dexterous shake to pass over and in rear of the cross-bar, and they are held between such cross-bar and the fork-head while the fork is picking up other potatoes. An additional guard 11 is arranged horizontally over the top edge of the fork-head, this being also preferably made of wire, having its terminals bent downwardly at right angles and inserted in the head-board, as shown. This serves as an additional safeguard for preventing the potatoes, as they begin to pile up within the fork or scoop, from passing over the top of the fork-head.

The fork described effects a considerable saving in time and the labor required in gathering potatoes, obviating, as it does, the necessity for a person stooping to any extent in order to gather the potatoes.

Various changes in the form, proportion, and minor details of construction may be resorted to without departing from the spirit or sacrificing any of the advantages of this invention.

Having thus described the invention, what is claimed as new is—

1. In a device of the character described, the combination with the head, and a suitable handle, of a series of tines, a wooden cross-bar or guard extending transversely over and bearing upon said tines, and a series of staples embracing the tines and driven into said cross-bar from beneath, substantially as specified.

2. The herein-described fork or scoop, the same comprising a suitable head, a handle therefor, a series of tines projecting from said head, a transversely-disposed cross-bar or guard resting upon said tines, oppositely-disposed V-shaped end guards composed of wire and having their terminals passed through said head and deflected against the rear side thereof and secured by staples, and a supplemental guard composed of wire extending above and in parallelism to the top edge of the head, and having its terminals bent downward and inserted in said head, substantially as and for the purpose described.

In testimony that I claim the foregoing as my own I have hereto affixed my signature in the presence of two witnesses.

NATHAN F. REED.

Witnesses:
CARLOS S. NOYES,
ARTHUR C. NOYES.